(12) United States Patent
Borchert et al.

(10) Patent No.: US 8,003,041 B2
(45) Date of Patent: Aug. 23, 2011

(54) PROCESS FOR THE PRODUCTION OF HOLLOW BODIES OF THERMOPLASTIC MATERIAL

(75) Inventors: Matthias Borchert, Bonn (DE); Dirk Eulitz, Bonn (DE); Gerd Wolter, Konigswinter (DE); Timo Kramer, Hirz-Maulsbach (DE); Harald Lorenz, Bad Neuenahr-Ahrweiler (DE); Deniz Bienhuls, Windhagen (DE); Christoph Mehren, Konigswinter (DE); Robert Lower, Rheinbach (DE)

(73) Assignee: Kautex Textron GmbH & Co. KG, Bonn (DE)

( * ) Notice: Subject to any disclaimer, the term of this patent is extended or adjusted under 35 U.S.C. 154(b) by 326 days.

(21) Appl. No.: 11/760,655

(22) Filed: Jun. 8, 2007

(65) Prior Publication Data
US 2009/0045542 A1    Feb. 19, 2009

Related U.S. Application Data

(60) Provisional application No. 60/806,491, filed on Jul. 3, 2006.

(51) Int. Cl.
*B29C 49/20*  (2006.01)
(52) U.S. Cl. .............. 264/516; 264/523; 264/267
(58) Field of Classification Search ............ 264/171.12, 264/531, 534, 540, 259, 267, 516, 523; 425/528, 425/534, 503, 518, 519, 520, 538, 541
See application file for complete search history.

(56) References Cited

U.S. PATENT DOCUMENTS

| 4,595,449 | A | * | 6/1986 | Nowicki | 156/444 |
| 4,719,072 | A | * | 1/1988 | Kojima et al. | 264/515 |
| 4,824,630 | A | * | 4/1989 | Mohney | 264/509 |

(Continued)

FOREIGN PATENT DOCUMENTS

DE    10010900 A1 *  9/2001

(Continued)

OTHER PUBLICATIONS

European Search Report issued in related European Patent Application No. 07010739.6-1253 dated Oct. 24, 2007.

*Primary Examiner* — Joseph S Del Sole
*Assistant Examiner* — Ryan Ochylski
(74) *Attorney, Agent, or Firm* — Grossman Tucker Perreault & Pfleger, PLLC

(57) ABSTRACT

The invention concerns a process for the production of hollow bodies of thermoplastic material. In the process according to the invention preforms in web or band form of plasticized material are shaped in a multi-part tool forming a mold cavity comprising two outer molds and at least one central mold which perform an opening and closing movement relative to each other. The central mold is provided with at least one component holder which can be moved of and into the tool plane defined by the central mold. In a first step the component holder is fitted with at least one insert portion, then the insert portion is placed by means of the component holder against the inside wall of an outer mold. In a further step introduction and shaping of the preforms within the tool is effected in a two-stage procedure, wherein firstly the preforms are respectively applied against a contour forming a part of the mold cavity by means of increased pressure and/or reduced pressure and shaped and then the intermediate products forming respective parts of the hollow body are joined together to form a finished product.

5 Claims, 4 Drawing Sheets

U.S. PATENT DOCUMENTS

| | | | |
|---|---|---|---|
| 4,840,366 A * | 6/1989 | Johnston et al. | 271/14 |
| 4,948,357 A * | 8/1990 | Legge et al. | 425/522 |
| 5,326,514 A * | 7/1994 | Linden et al. | 264/83 |
| 5,534,218 A * | 7/1996 | Daubenbuchel et al. | 264/516 |
| 6,183,238 B1 * | 2/2001 | Dunlap et al. | 425/503 |
| 6,814,921 B1 | 11/2004 | Van Schaftingen et al. | |
| 6,866,812 B2 | 3/2005 | Van Schaftingen et al. | |
| 6,916,442 B2 | 7/2005 | Dupont et al. | |
| 6,948,511 B2 | 9/2005 | Taurel et al. | |
| 7,166,253 B2 | 1/2007 | Van Schaftingen et al. | |
| 2003/0164572 A1 | 9/2003 | Pappert et al. | |
| 2007/0029329 A1 | 2/2007 | Dubois et al. | |

FOREIGN PATENT DOCUMENTS

| | | | |
|---|---|---|---|
| EP | 0595185 | | 3/1994 |
| EP | 1334817 | | 8/2003 |
| JP | 61148021 A | * | 7/1986 |
| JP | 03097522 A | * | 4/1991 |
| JP | 07205265 A | * | 8/1995 |
| JP | 08020243 A | * | 1/1996 |
| JP | 11188781 | | 7/1999 |
| JP | 2006015744 | | 1/2006 |
| WO | WO 8705276 A1 | * | 9/1987 |

* cited by examiner

PROCESS FOR THE PRODUCTION OF HOLLOW BODIES OF THERMOPLASTIC MATERIAL

CROSS-REFERENCE TO RELATED APPLICATIONS

This application claims priority to German Application DE 10 2006 027 256, filed Jun. 9, 2006 and to U.S. Provisional Application 60/806,491 filed Jul. 3, 2006.

FIELD

The invention concerns a process for the production of hollow bodies of thermoplastic material by extrusion blow molding.

BACKGROUND

The operation of extrusion blow molding plastic products usually involves using mold tools which comprise two mold halves which are of a mutually complementary configuration and which jointly define a mold cavity. A thermoplastic extrudate, generally in the form of a tube, is placed between the opened halves of the tool. The tool closes around the preform and the preform is applied within the tool against the inside wall of the cavity formed by the tool so that the finished article is of an external configuration corresponding to the internal contour of the mold tool. Shaping of the preform within the cavity of the tool is effected either by expansion of the preform by means of gas pressure or by causing the preform to apply to the inside wall of the tool by means of reduced pressure which is produced by way of passages in the inside wall of the mold.

It is equally known for extrudates in web form or band form to be continuously extruded above the opened tool into the tool or for the extrudates to be removed from an extruder by means of a manipulator while in a still plastic condition and introduced between the opened portions of the tool.

By virtue of the shaping effect by expansion by means of an increased internal pressure or by virtue of applying the preform against the inside wall of the mold by means of vacuum, the extrusion blow molding process is basically not suitable for the production of those parts which are to involve slight wall thickness tolerances. In addition parts with severely undercut configurations are difficult to produce. Therefore in relation to many hollow bodies parts such as for example screwthreads, holding handles or the like are produced in the form of separate components and molded to the hollow body in the procedure for shaping the hollow body within the mold. Such parts are generally referred to as insert portions. It is also known for labels to be produced in the form of insert portions (in-mold labeling). For that purpose the insert portion is placed in the mold by means of a manipulator prior to the introduction of the preform.

If components are to be placed within the product as it is being produced the portion in question is also placed by means of a manipulator or holder between the opened mold halves in such a way that the generally tubular extrudate surrounds the component which is to be blow molded therearound. The mold or the tool then closes around the tube and around the component received thereby. The use of manipulators is rather troublesome in terms of their integration into the production cycle.

The object of the invention is therefore that of providing a novel process for the production of extrusion blow molded products, in which in particular the introduction of insert portions is comparatively simply integrated into the process.

SUMMARY

The object is attained by a process for the production of hollow bodies of thermoplastic material, in which preforms in web or band form of plasticized plastic material are shaped in a multi-part tool forming a mold cavity comprising two outer molds and at least one central mold which perform an opening and closing movement relative to each other, wherein the central mold is provided with at least one component holder which can be moved of and into the tool plane defined by the central mold, wherein in a first step the component holder is fitted with at least one insert portion, then the insert portion is placed by means of the component holder against the inside wall of an outer mold and wherein in a second step introduction and shaping of the preforms within the tool is effected in a two-stage procedure, wherein firstly the preforms are respectively applied against a contour forming a part of the mold cavity by means of increased pressure and/or reduced pressure and shaped and then the intermediate products forming respective parts of the hollow body are joined together to form a finished product.

The invention can be summarized to the effect that, in the production of an extrusion blow molded product by means of a three-part tool with a central mold, the central mold is used instead of a manipulator which is otherwise required for placement of one or more insert portions in the mold.

The process according to the invention is to be so interpreted that extrusion of the preforms can be effected for example by means of wide-slot nozzles in a hanging condition and continuously, wherein the tool comprising three or more mold portions can be displaceable with respect to the stationarily arranged extrusion heads. As an alternative thereto the preforms can be removed at the extrusion head by means of one or more grippers and placed between the opened or opening portions of the blow molding mold.

Desirably the preforms are shaped against or around the insert portion which is arranged at the inside wall of an outer mold. Hereinafter reference is only ever made in each case to an insert portion, but it will be appreciated that the invention is to be so interpreted that any number of insert portions can be placed in the mold in question by means of a desired number of component holders.

Desirably shaping of the preforms takes place in the first heat, that is to say without further plasticisation by virtue of a renewed action of heat. In other words in the shaping procedure the preform is approximately at the temperature which the extrudate has on issuing from the extrusion head.

The process includes displacement of the central mold transversely with respect to the opening and closing movement of the tool or the outer mold with respect to the central mold. The opening and closing movement of the tool generally occurs horizontally, with respect to the plane in which the apparatus extends, but it will be appreciated that the opening and closing movement of the tool can also take place on an inclined plane.

In a preferred variant of the invention a movement cycle of the tool includes at least the steps of moving out the central mold from between the outer molds for the purposes of equipping the component holder, moving in the central mold back in, closing the outer molds against the central mold, opening the outer molds, moving out the central mold, closing the outer molds against each other and opening the outer molds for removal of the product.

If the finished product is also to include built-in fitment components, it is particularly desirable that, after the introduction of the insert portion, further equipping of the component holder or a further component holder is to be effected at the central mold with at least one fitment component which is to be placed within the product, wherein placement of said fitment component is effected after application of the preforms against the contour of the mold cavity.

Thus in an advantageous fashion multiple use of the central mold or component holders which are displaceable therein can completely replace a plurality of manipulators which are otherwise required. Such manipulators require a great deal of space for them to be set up, and in addition they are found to be troublesome in regard to the required displacement movement of the tool.

If the central mold and the component holders arranged at or in same are to be used both for the placement of insert portions and also for the placement of built-in fitment components, it can be provided for example that the movement cycle of the tool further includes the steps of again moving out the central mold after placement of the insert portion for the purposes of equipping a component holder with a fitment component and again moving the central mold in between the outer molds. Alternatively it can be provided that in a first process step a plurality of component holders are equipped with at least one insert portion which is to be introduced into the mold and with at least one fitment component which is to be introduced into the product, wherein the insert portion is placed prior to introduction of the preforms and the fitment component is placed after application of the preforms against the mold wall.

DESCRIPTION OF THE DRAWINGS

The process according to the invention is described hereinafter by means of an embodiment by way of example illustrated in the Figures, wherein accompanying FIGS. 1 through 8 diagrammatically show a movement cycle of the tool in which both an insert portion is introduced into the mold and also two fitment components are placed in the finished product.

DETAILED DESCRIPTION

Figure 1:
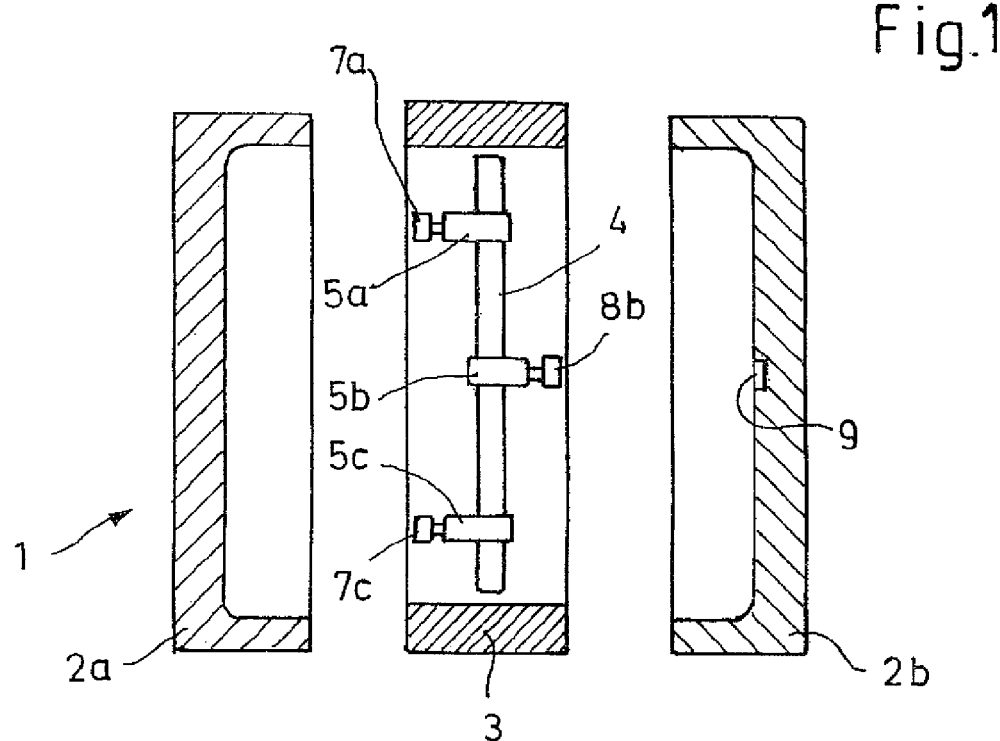

In the Figures, the tool identified by reference 1 is shown in cross-section, the tool being of a three-part configuration and comprising two outer molds 2a, 2b and a central mold 3. The outer molds 2a, 2b are displaceable away from and towards each other in the sense of an opening and closing movement, while the central mold 3 is displaceable with respect to the outer molds 2a, 2b transversely with respect to the opening and closing movement of the outer molds. The molds are each fixed in known manner to respective known mold mounting plates which are not shown for the sake of simplicity, the mounting plates being displaceable or movable in a closing frame structure which is also not shown. An extrusion device for producing preforms in web or band form is also not shown for reasons of simplification. By way of example, with reference to FIG. 1, two suitable extrusion heads with wide-slot nozzles can be arranged above the tool 1 on the side towards the person viewing the drawing, outside the plane of the drawing.

Arranged within the central mold 3 is a displaceable carrier 4 which is respectively displaceable towards the one outer mold 2a, 2b or the other. (See FIG. 2). Arranged on the carrier 4 are respective displaceable component holders 5a, 5b, 5c which are displaceable with respect to the carrier 4 by way of pneumatic cylinders 6. In FIG. 1 the tool is shown in a phase in the movement cycle, at which the component holders 5a, 5c are each equipped with a fitment component 7a, 7c, and the component holder 5b with an insert portion 8b.

Preceding that is the operation of equipping the component holders 5a, 5b, 5c with their respective parts, for which purpose the central mold 3 was displaced transversely with respect to the outer molds 2a, 2b. That position of the central mold 3 is not shown in the drawings.

Figure 2:
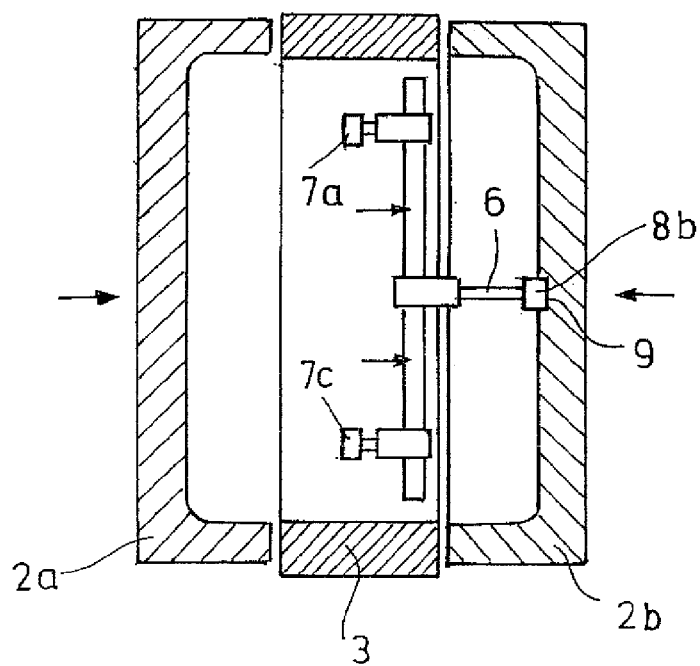
Figure 3:
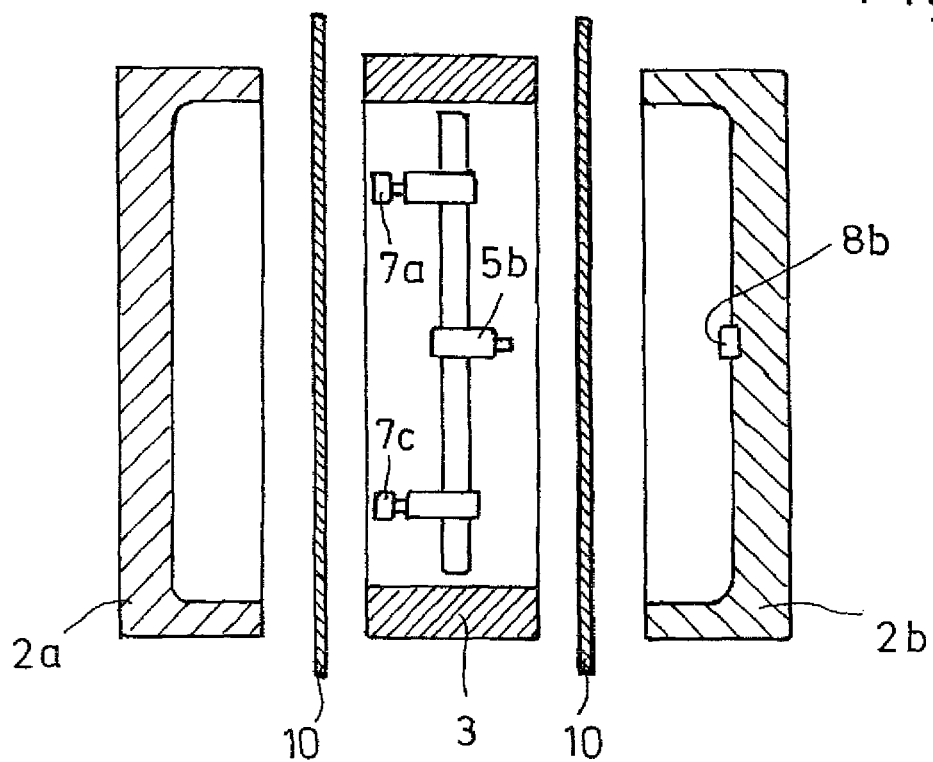

After the central mold 3 has been moved into the position shown in FIG. 1 again, the outer molds 2a, 2b are moved towards each other, as is shown in FIG. 2. In that situation the outer molds 2a, 2b do not necessarily have to be entirely closed. The carrier 4 is moved in the direction of the arrows shown in FIG. 2 towards the outer mold 2b and then the cylinder 6 of the component holder 5b is extended in a direction towards the outer mold 2b, and the insert portion 8b is placed in a recess 9 provided for same in the inside wall of the outer mold 2b. The carrier 4 and the component holder 5b are then moved back into their starting position again. The outer molds 2a, 2b are opened (FIG. 3) and the preforms in web form which are identified by reference 10 and which comprise plasticized thermoplastic material are respectively placed or suspended between the outer molds 2a, 2b and the central mold 3.

Figure 4:
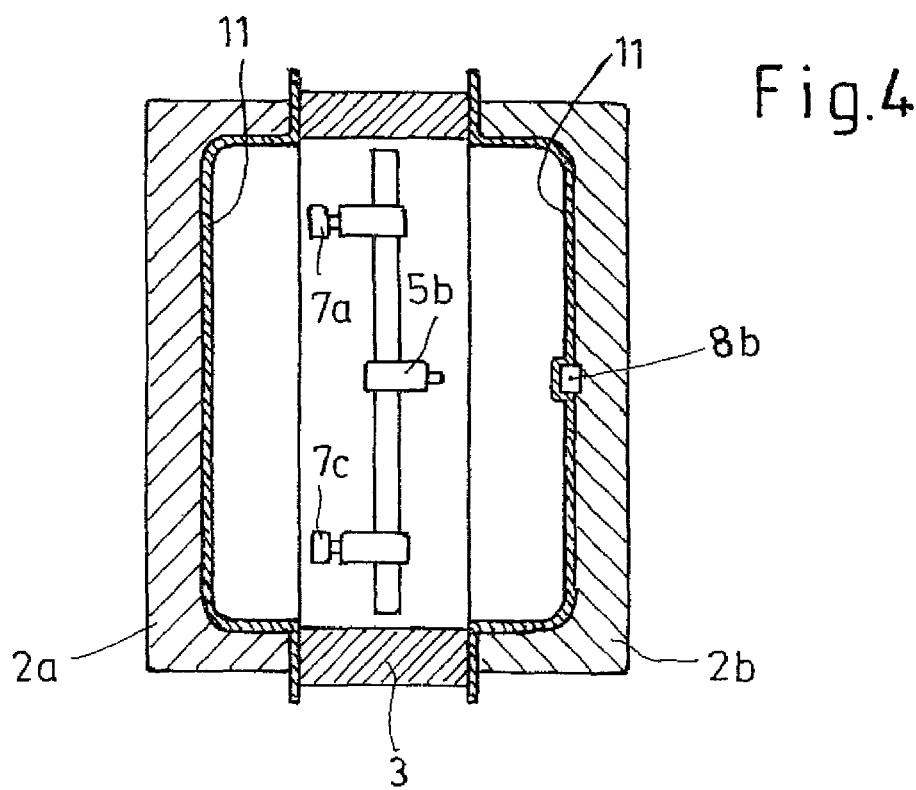

The outer molds 2a, 2b are then respectively closed against the central mold 3 and the preforms 10 are applied against the inside contour of the outer molds 2a, 2b by means of an increased internal pressure, for example by the introduction of compressed air, or the preforms 10 are shaped in that way, wherein a preform 10 flows around the insert portion 8b placed at the inside contour of the outer mold 2b and is joined thereto. (See FIG. 4).

Figure 5:
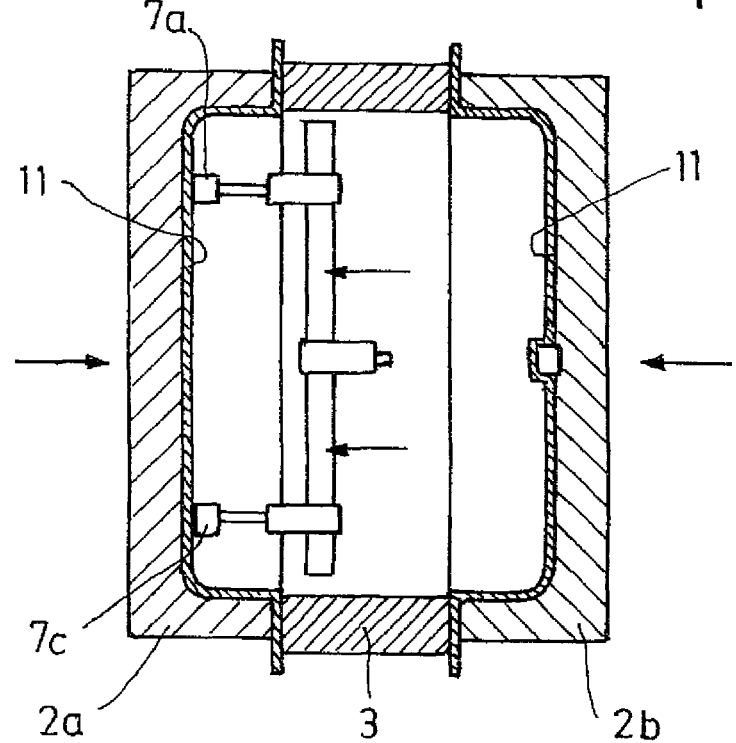
Figure 6:
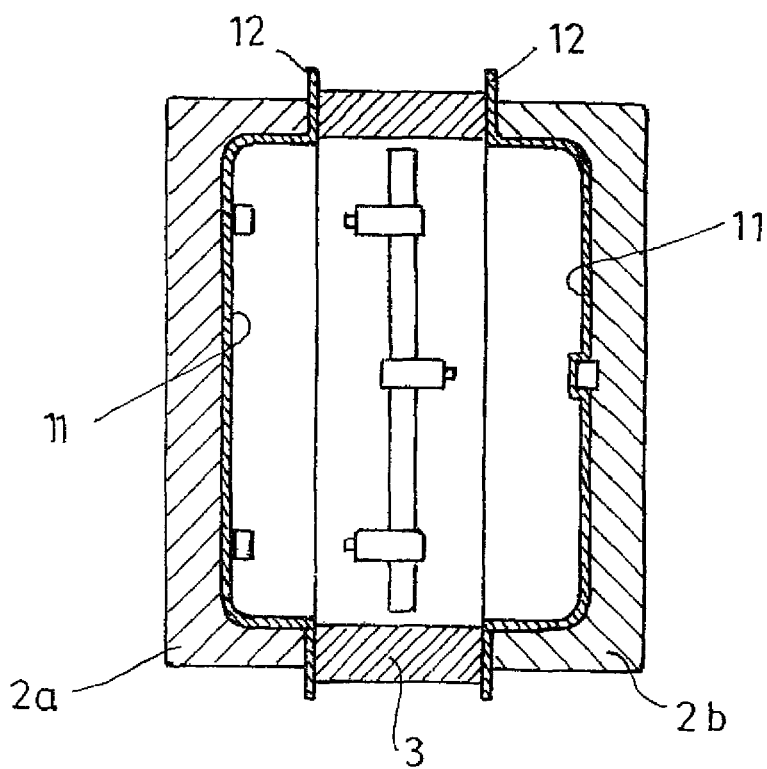

In a further step in the process (FIG. 5) the carrier 4 and the cylinders 6 of the component holders 5a, and 5c are moved out in a direction towards the inside contour of the outer molds 2a, and the components 7a, 7c are pressed by way of the component holders 5a, 5c against the inside wall of the preform 10 which has already been shaped. The fitment components 7a, 7c remain at the inside wall of the intermediate products 11 when, as shown in FIG. 6, the carrier 4 and the component holders 5a, 5b move back into the starting position.

Figure 7:
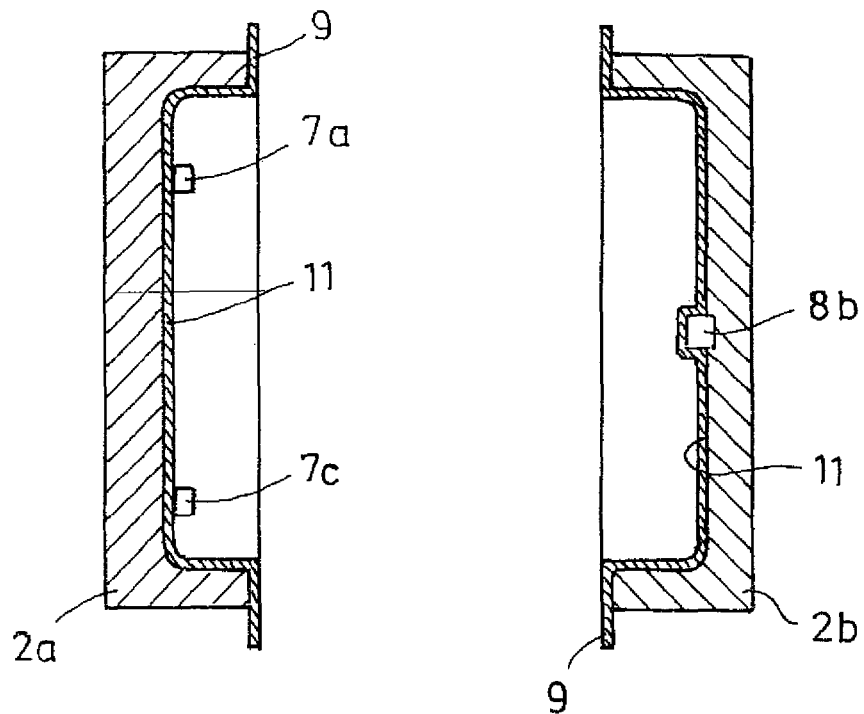

The outer molds 2a, 2b are then opened and the central mold 3 is moved away between the outer molds 2a, 2b (FIG. 7).

Figure 8:
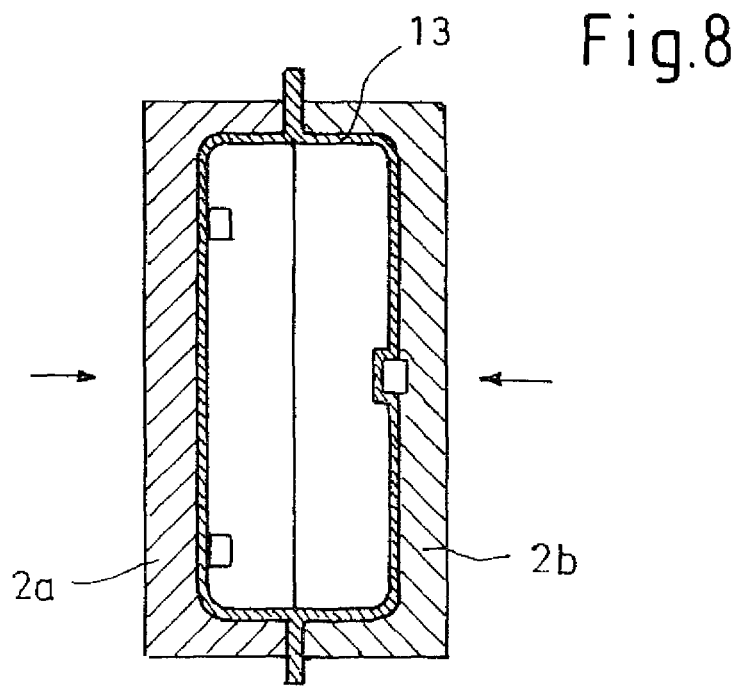

In a further step the outer molds 2a, 2b are closed against each other so that the intermediate products 11 which form two half-shell portions are welded together to form a hollow body at their flange-like edges 12. (See FIG. 8).

In a further step in the process (not shown) the outer molds 2a, 2b are moved away from each, that is to say opened, and the finished product 13 is removed from the tool 1. At the same time as the intermediate products 11 are joined to afford the finished product 13, the operation of equipping the component holders 5a, 5b, 5c with components can be effected. The movement of the central mold with the equipped component holders 5a, 5b, 5c into the position shown in FIG. 1 is also not illustrated.

As has already been described in the opening part of this specification, the component holders 5a, 5b, 5c can be equipped in two successively occurring portions of the movement of the central mold 3. Such an intermediate step is not provided in the specific embodiment described.

LIST OF REFERENCES

1 tool
2a, 2b outer molds 3 central mold
4 carrier
5a, 5b, 5c component holder
6 cylinder
7a, 7c fitment components
8b insert portion
9 recess
10 preforms
11 intermediate products
12 edges
13 product

The invention claimed is:

1. A process for the production of hollow bodies of thermoplastic material, comprising the steps of:
    providing a multi-part tool forming a mold cavity comprising two outer molds each having an inside wall and at least one central mold which perform an opening and closing movement relative to each other, wherein the central mold is provided with at least one component holder which can be moved out of and into a tool plane defined by the central mold,
    moving the central mold transversely out from between the outer molds for the purpose of equipping the at least one component holder,
    fitting the at least one component holder with at least one insert portion, wherein said component holder is arranged on a carrier, said carrier arranged within said central mold,
    moving the central mold transversely back in between the outer molds,
    placing the at least one insert portion against the inside wall of a first of the two outer molds by extending the at least one component holder in a direction towards the first one of the two outer molds,
    providing at least two preforms in web or band form of plasticized material,
    shaping the preforms within the tool in a two-stage procedure, wherein firstly, the preforms are respectively placed between the outer molds and the central mold, the outer molds are closed against the central mold and the preforms are applied against a contour forming part of the inside wall of each of the two outer molds by means of increased pressure and/or reduced pressure and shaped to form at least two intermediate products each having an inside wall,
    opening the outer molds,
    transversely moving out the central mold,
    closing the outer molds against each other, and
    in a second stage, joining the intermediate products forming respective parts of the hollow body together to form a finished product, and
    opening the outer molds for removal of the product.

2. A process as set forth in claim 1 characterized in that the preforms are shaped against or around the at least one insert portion which is arranged at the inside wall of the first of the two outer molds.

3. A process as set forth in claim 1 characterized in that shaping of the preforms takes place in a first heat.

4. A process as set forth in claim 1 characterized in that the movement cycle of the tool further includes the steps of again moving out the central mold after placement of the at least one insert portion for the purposes of equipping the at least one component holder with a fitment component and again moving the central mold in between the outer molds.

5. A process as set forth in claim 1 characterized in that a plurality of component holders are equipped with at least one insert portion which is to be introduced into the mold and with at least one fitment component which is to be introduced into the intermediate product, wherein the insert portion is placed prior to introduction of the preforms and the fitment component is placed after the preforms are applied against the inside wall of each of the two outer molds.

* * * * *

UNITED STATES PATENT AND TRADEMARK OFFICE
CERTIFICATE OF CORRECTION

| | |
|---|---|
| PATENT NO. | : 8,003,041 B2 |
| APPLICATION NO. | : 11/760655 |
| DATED | : August 23, 2011 |
| INVENTOR(S) | : Borchert et al. |

It is certified that error appears in the above-identified patent and that said Letters Patent is hereby corrected as shown below:

On face page, field 60, in column 1, under "Related U.S. Application Data", delete "60/860,491" and insert -- 60/806,493 --, therefor.

In column 1, under "Cross-Reference To Related Applications", line 10, delete "60/806,491" and insert -- 60/806,493 --, therefor.

Signed and Sealed this
Twenty-second Day of November, 2011

David J. Kappos
*Director of the United States Patent and Trademark Office*